US011829537B1

(12) United States Patent
Chang et al.

(10) Patent No.: US 11,829,537 B1
(45) Date of Patent: Nov. 28, 2023

(54) UNIVERSAL CLICK PAD MECHANISM (71) Applicant: DELL PRODUCTS L.P., Round Rock, TX (US)

(72) Inventors: Yaotsung Chang, Neihu Dist. (TW); Hou-Chun Wang, Linkou Dist. (TW); Tsanwei Liu, New Taipei (TW)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/966,592

(22) Filed: Oct. 14, 2022

(51) Int. Cl.
*G06F 3/0354* (2013.01)
(52) U.S. Cl.
CPC ................ *G06F 3/03547* (2013.01)
(58) Field of Classification Search
CPC .............. G06F 3/03547; G06F 3/016
See application file for complete search history.

(56) References Cited

U.S. PATENT DOCUMENTS

| | | | |
|---|---|---|---|
| 8,780,543 B2* | 7/2014 | Molne | G02F 1/133526 345/173 |
| 9,466,783 B2* | 10/2016 | Olien | H10N 30/09 |
| 11,301,053 B2 | 4/2022 | Gajiwala et al. | |
| 11,442,562 B2* | 9/2022 | Li | G06F 3/03547 |
| 2015/0185779 A1* | 7/2015 | Doi | G06F 1/1662 181/207 |
| 2018/0081483 A1* | 3/2018 | Camp | G06F 3/016 |

* cited by examiner

*Primary Examiner* — Rodney Amadiz
(74) *Attorney, Agent, or Firm* — Larson Newman, LLP (57) ABSTRACT

An information handling system includes a palm rest portion of a keyboard cover, a touchpad holder, and a spring plate. The spring plate includes a main frame in physical communication with the palm rest portion, and first and second spring arms in physical communication with the touchpad holder. In response to a force being exerted on any area of the touchpad holder, the first and second spring arms transition from a resting position to a clicked position.

17 Claims, 5 Drawing Sheets

FIG. 5

UNIVERSAL CLICK PAD MECHANISM

FIELD OF THE DISCLOSURE

This disclosure generally relates to information handling systems, and more particularly relates to a universal click pad mechanism.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a palm rest portion of a keyboard cover, a touchpad holder, and a spring plate. The spring plate includes a main frame in physical communication with the palm rest portion, and first and second spring arms in physical communication with the touchpad holder. In response to a force being exerted on any area of the touchpad holder, the first and second spring arms may transition from a resting position to a clicked position.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
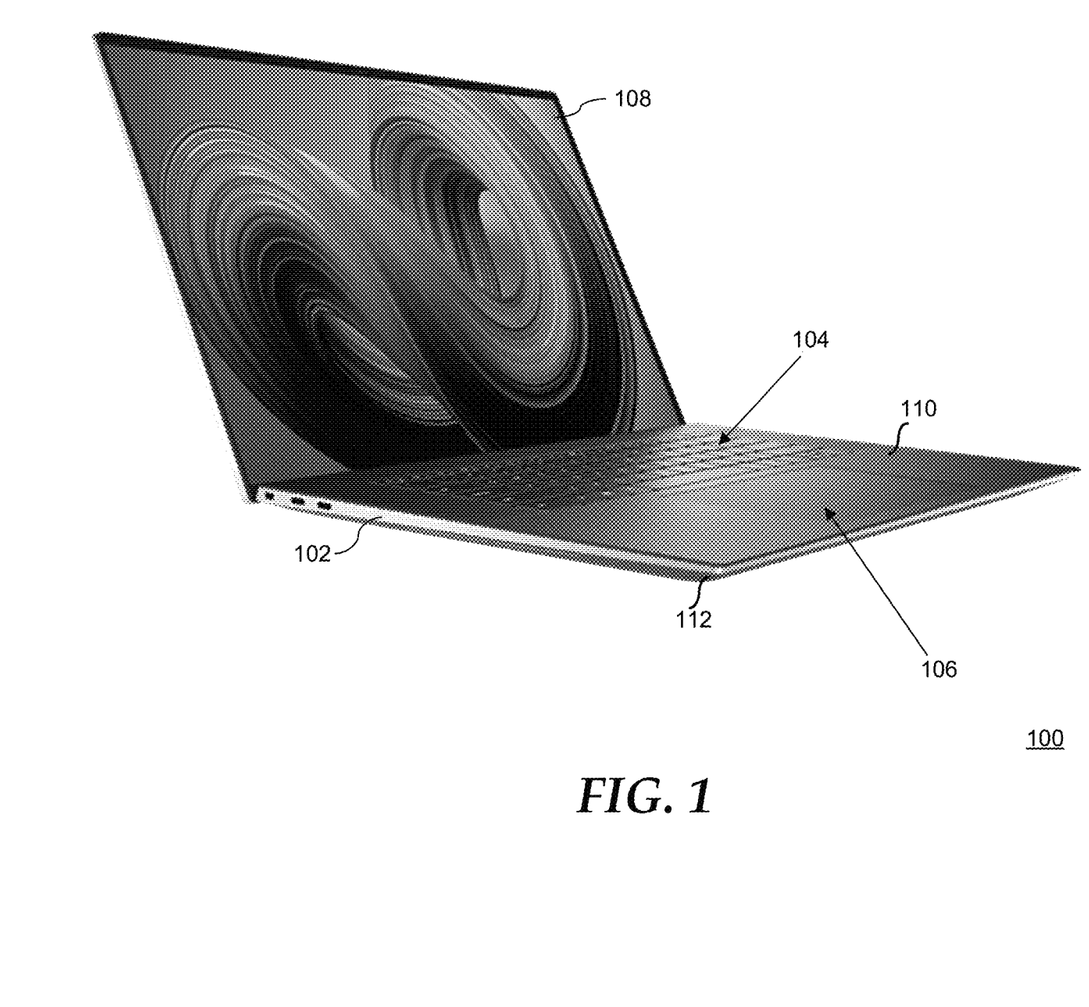
FIG. 1 is a perspective view of an information handling system according to an embodiment of the present disclosure.

FIG. 1 is a diagram of an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100, such as a mobile laptop computer, includes an outer enclosure 102, a keyboard 104, a touchpad 106, a display 108, a palm rest or keyboard cover 110, and a back cover 112. In previous information handling systems, all portions of a touchpad may receive an input from a user, but not all portions of the touchpad may be physically clickable. In this situation, a front side of the touchpad may be physically clickable, but a rear side of the touchpad may not be physically clickable. As used herein, the front side of the touchpad is a portion furthest from the keyboard, and the rear side of the touchpad is a portion closest to the keyboard.

Figure 2:
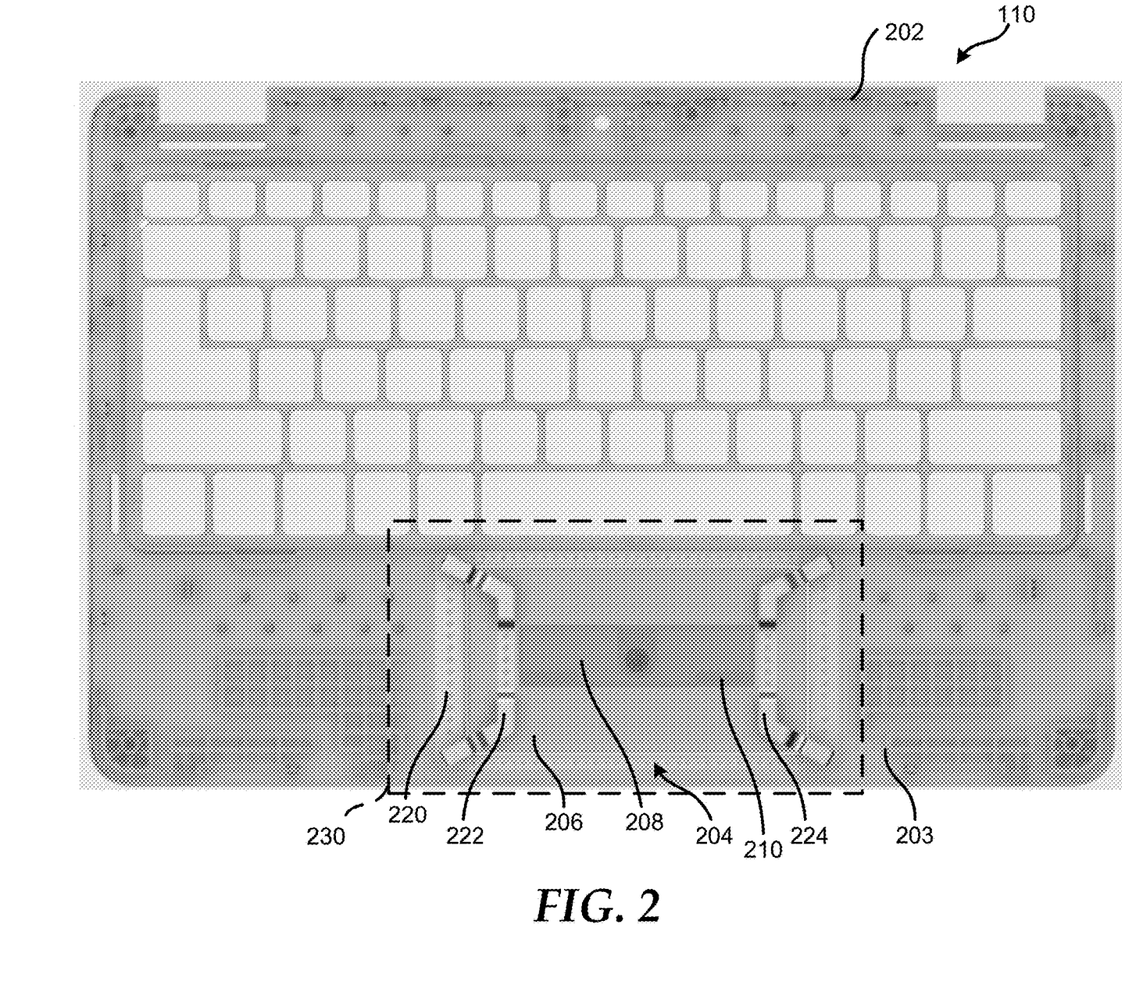
FIG. 2 is a diagram of a bottom side of a keyboard cover according to an embodiment of the present disclosure.

FIG. 2 illustrates a bottom or back side of keyboard cover 110 according to an embodiment of the present disclosure. Keyboard cover 110 includes a keyboard cover portion 202, a palm rest portion 203, a spring plate 204, a touchpad holder 206, a touchpad module 208, and a touchpad cover 210. In an example, touchpad holder 206, touchpad module 208, and touchpad cover 210 may combine to form a single touchpad, such as touchpad 106 of FIG. 1. Spring plate 204 includes a main frame 220, and spring arms 222 and 224. In certain example, spring plate 204 may be any suitable material including, but not limited to, metal. In an example, spring plate 204 may be insert-molded together with both palm rest portion 203 and touchpad holder 206 as will be described herein. In this example, spring plater 204 may be securely connected to palm rest portion 203 and touchpad holder 206 via the insert molding process. Insert molding is a manufacturing process know to those of skill in the art and will not be further described herein except to illustrate aspects of the current disclosure.

In an example, touchpad module 208 may detect and process user inputs on touchpad cover 210. Touchpad module 208 may provide the user inputs to a processor, such as processor 502 of FIG. 5. In certain examples, spring arms 222 and 224 of spring plate 204 may be insert-molded with and provide support to touchpad holder 206. Main frame 220 is insert-molded with palm rest portion 203 of keyboard cover 110. In an example, the inset-molding may include spring plate 204 being bonded by the plastic structure of palm rest portion 203.

Figure 3:
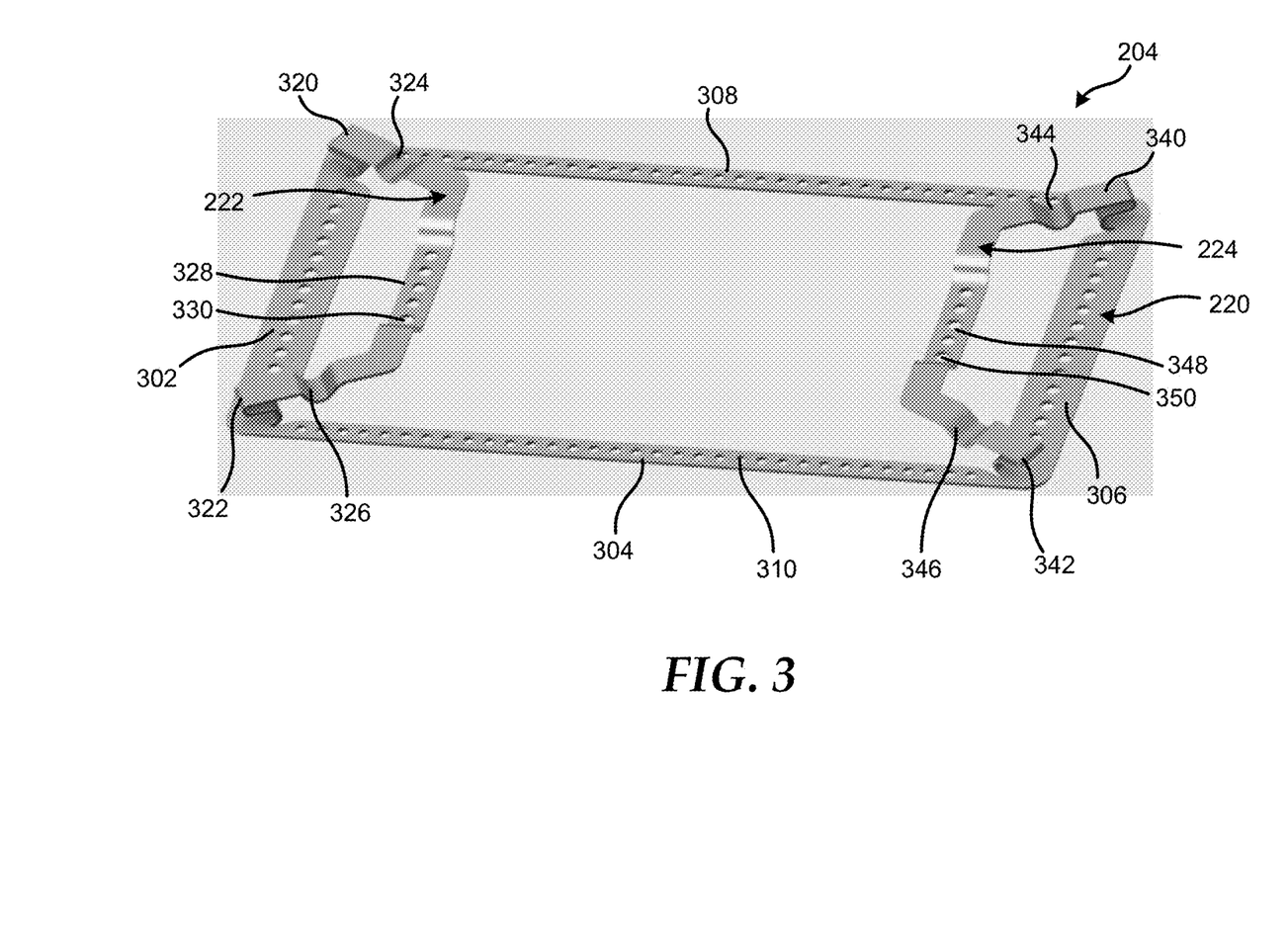
FIG. 3 is a diagram of a spring plate according to an embodiment of the present disclosure.

FIG. 3 illustrates spring plate 204 having main frame 220 and spring arms 222 and 224 according to an embodiment of the present disclosure. Main frame 220 includes sides 302, 304, 306, and 308. In an example, sides 302, 304, 306, and 308 may be combined to form any suitable shape that is substantially similar to a shape of touch pad holder 206 of FIG. 2. For example, sides 302, 304, 306, and 308 may form a rectangle, such that side 308 extends perpendicularly from a first end of side 302 to a first end of side 306, and side 304 extends perpendicularly from a second end of side 302 and a second end of side 306. Sides 302 and 306 may be substantially parallel with each other, and sides 304 and 308 may be substantially parallel with each other.

In an example, a first end of spring arm 222 may connect with main frame 220 at the intersection of sides 302 and 308, and a second end of spring arm 222 may connect with the main frame at the intersection of sides 302 and 304. Spring arm 222 includes spring mechanisms 320 and 322, support portions 324, 326, and 328, and molding holes 330. In certain examples, spring mechanisms 320 and 322 may have any suitable structure to enable spring arm 222 may flex away from a resting position in response to a force on touchpad holder 206, and spring or snap back to the resting position when the force is removed.

Figure 4:
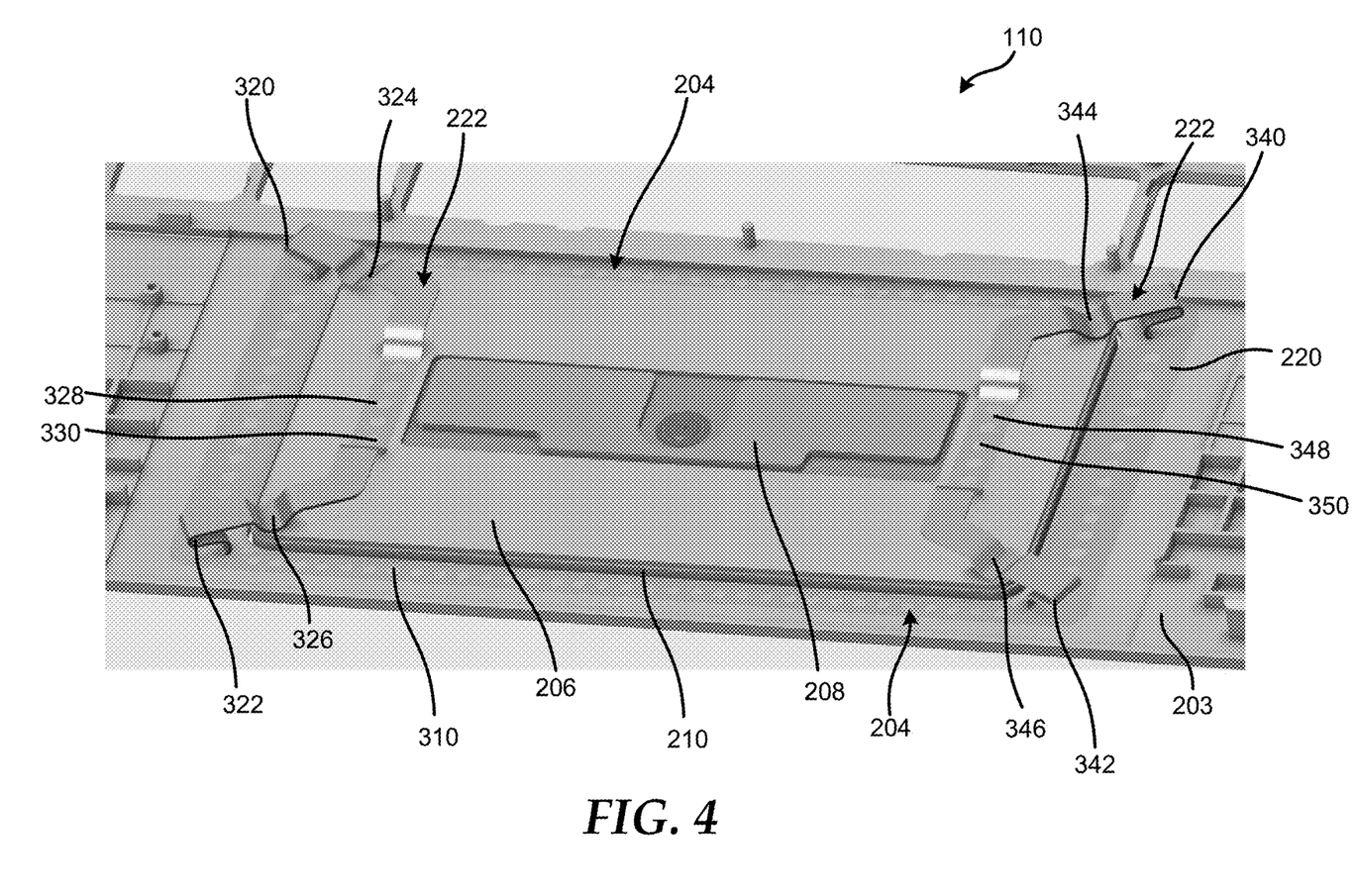
FIG. 4 is a diagram of a portion of a bottom side of a keyboard cover and a spring plate according to an embodiment of the present disclosure.

In certain examples, spring arm 222 may fold back on itself multiple times in different locations to create spring mechanisms 320 and 322. For example, in one location of spring arm 222, the spring arm may fold back on itself multiple times to create spring mechanism 320. Similarly, in another location of spring arm 222, the spring arm may fold back on itself multiple times to create spring mechanism 322. In an example, spring mechanism 320 may be located substantially above the intersection of sides 302 and 308 of main frame 220, and spring mechanism 322 may be located substantially above the intersection of sides 302 and 304 of main frame 220. In certain examples, spring arm 222 may extend from both of spring mechanisms 320 and 322 and overlap touchpad holder 206 as shown in FIG. 4. Support portions 324, 326, and 328 may dip to be in physical communication with touchpad holder 206 of FIGS. 2 and 4.

In an example, a first end of spring arm 224 may connect with main frame 220 at the intersection of sides 306 and 308, and a second end of spring arm 224 may connect with the main frame at the intersection of sides 306 and 304. Spring arm 224 includes spring mechanisms 340 and 342, support portions 344, 346, and 348, and molding holes 350. In certain examples, spring mechanisms 340 and 342 may have any suitable structure to enable spring arm 224 may flex away from a resting position in response to a force on touchpad holder 206, and spring or snap back to the resting position when the force is removed.

In certain examples, spring arm 224 may fold back on itself multiple times in different locations to create spring mechanisms 340 and 342. For example, in one location of spring arm 224, the spring arm may fold back on itself multiple times to create spring mechanism 340. Similarly, in another location of spring arm 224, the spring arm may fold back on itself multiple times to create spring mechanism 342. In an example, spring mechanism 340 may be located substantially above the intersection of sides 306 and 308 of main frame 220, and spring mechanism 342 may be located substantially above the intersection of sides 306 and 304 of main frame 220. In certain examples, spring arm 224 may extend from both of spring mechanisms 340 and 342 and overlap touchpad holder 206 as shown in FIG. 4. Support portions 344, 346, and 348 may dip to be in physical communication with touchpad holder 206 of FIGS. 2 and 4.

FIG. 4 illustrates a portion 230 as shown in FIG. 2 of a bottom side of a keyboard cover 110, spring plate 204, touchpad holder 206, touchpad module 208, and touchpad cover 210 according to an embodiment of the present disclosure. During an injection molding process, the plastic of palm rest portion 203 of the keyboard cover 110 may flow within holes 310 of main frame 220. Based on the plastic mold flowing within holes 310, main frame 220 of spring plate 204 may have secure bonding adhesion with palm set portion 203 of keyboard cover 110.

During an injection molding process, the plastic of touchpad holder 206 may flow within holes 330 of spring arm 328 and within holes 350 of spring arm 224. Based on the plastic mold flowing within holes 330 and 350, spring plate 204 may have secure bonding adhesion with touchpad cover 206. The secure bonding adhesion between main frame 220 and palm rest portion 203 and between spring arms 222 and 224 and touchpad holder 206 may form the palm rest portion, spring plate 204, and touchpad holder 206 as a single component of an information handling system, such as information handling system 100 of FIG. 1.

In certain examples, if a user exerts a force anywhere on touchpad cover 210 that is greater than a holding force of spring mechanisms 320, 322, 340, and 342, spring arms 222 and 224 may flex away from a resting position. For example, if the user exerts a force on the front side of touchpad holder 206 via touchpad cover 210, spring arms 222 and 224 may flex away from a resting position to a clicked position. Additionally, if the user exerts a force on the rear side of touchpad holder 206 via touchpad cover 210, spring arms 222 and 224 may flex away from a resting position to a clicked position. As used herein, the front side of touchpad 106 is a portion furthest from keyboard 104, and the rear side of the touchpad is a portion closest to the keyboard. In an example, spring arms 222 and 224 may flex until each spring arm is placed in physical communication with back cover 112 of information handling system 100 in FIG. 1. In an example, touchpad holder 206 may be in a clicked position when spring arms 222 and 224 are in physical communication with back cover 210. When the force is removed spring mechanisms 320, 322, 340, and 342 may snap back to place touchpad holder 206 in an original or resting position. In an example, the movement or flexing of spring arms 222 and 224 may enable an entire area of touchpad 106 to be clickable. As used herein, clickable refers to an ability of touchpad 106 to move from a resting position, to clicked position, and back to the resting position based on forces exerted on touchpad cover 210 and touchpad holder 206.

Figure 5:
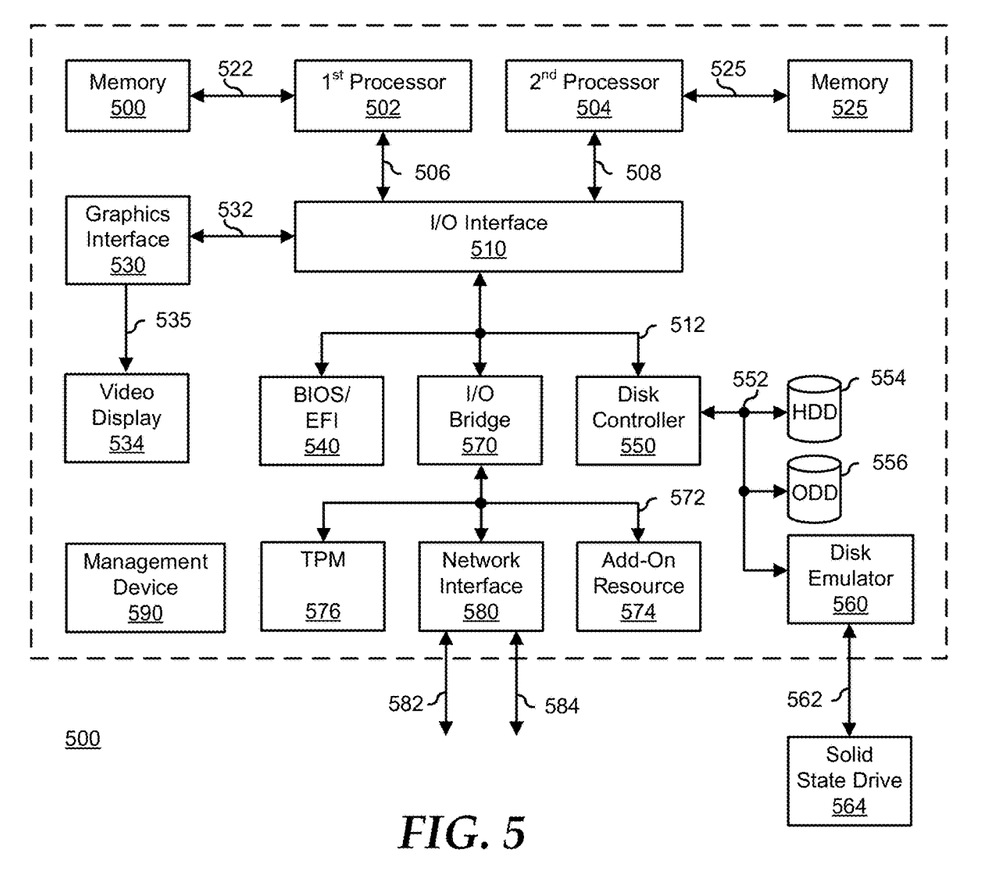
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 1695. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 3394 (Firewire) interface, a proprietary interface, or a combination thereof Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a palm rest portion of a keyboard cover;
   a touchpad holder; and
   a spring plate including:
      a main frame in physical communication with the palm rest portion;
      first and second spring arms in physical communication with the touchpad holder, wherein the first and second spring arms transition from a resting position to a clicked position in response to a force being exerted on any area of the touchpad holder; and
      a plurality of holes in the first spring arm, wherein the first spring arm is securely held in physical communication with the touchpad holder via secure bonding adhesion between a plastic of the touchpad holder and the holes in the first spring arm.

2. The information handling system of claim 1, wherein the spring plate further includes a plurality of holes in the main frame, wherein the main frame is securely held in physical communication with the palm rest via secure bonding adhesion between a plastic of the palm rest and the holes in the main frame.

3. The information handling system of claim 1, wherein the spring plate further includes a plurality of holes in the second spring arm, wherein the second spring arm is securely held in physical communication with the touchpad holder via secure bonding adhesion between a plastic of the touchpad holder and the holes in the second spring arm.

4. The information handling system of claim 1, wherein the palm rest portion, the touchpad holder and the spring plate form a single component based on the physical communication between the main frame and the palm rest portion and between the first and second spring arms and the touchpad holder.

5. The information handling system of claim 1, wherein the spring plate further includes a spring mechanism in the first spring arm, the spring mechanism includes a tension force to bias the first spring arm in the resting position.

6. The information handling system of claim 5, wherein in response to the force being removed from the touchpad the tension force to cause the spring plate to snap back to the resting position.

7. The information handling system of claim 1, wherein the spring plate is metal.

8. An information handling system comprising:
a palm rest portion of a keyboard cover;
a back cover;
a touchpad holder;
a spring plate including a main frame in physical communication with the palm rest portion;
first and second spring arms in physical communication with the touchpad holder, wherein the first and second spring arms transition from a resting position to a clicked position in response to a force being exerted on any area of the touchpad holder, wherein the first and second spring arms are in physical communication with the back cover when in the clicked position; and
a plurality of holes in the first spring arm, wherein the first spring arm is securely held in physical communication with the touchpad holder via secure bonding adhesion between a plastic of the touchpad holder and the holes in the first spring arm.

9. The information handling system of claim 8, wherein the spring plate further includes a plurality of holes in the main frame, wherein the main frame is securely held in physical communication with the palm rest via secure bonding adhesion between a plastic of the palm rest and the holes in the main frame.

10. The information handling system of claim 8, wherein the spring plate further includes a plurality of holes in the second spring arm, wherein the second spring arm is securely held in physical communication with the touchpad holder via secure bonding adhesion between a plastic of the touchpad holder and the holes in the second spring arm.

11. The information handling system of claim 8, wherein the palm rest portion, the touchpad holder and the spring plate form a single component based on the physical communication between the main frame and the palm rest portion and between the first and second spring arms and the touchpad holder.

12. The information handling system of claim 8, wherein the spring plate further includes a spring mechanism in the first spring arm, the spring mechanism includes a tension force to bias the first spring arm in the resting position.

13. The information handling system of claim 12, wherein in response to the force being removed from the touchpad the tension force to cause the spring plate to snap back to the resting position.

14. The information handling system of claim 8, wherein the spring plate is metal.

15. An information handling system comprising:
a back cover;
a touchpad holder including a front side and a rear side;
a spring plate including a main frame in physical communication with a palm rest portion of a keyboard cover;
first and second spring arms in physical communication with the touchpad holder, wherein the first and second spring arms transition from a resting position to a clicked position in response to a force being exerted on the rear side of the touchpad holder, wherein the first and second spring arms are in physical communication with the back cover when in the clicked position, wherein in response to the force being removed from the touchpad a tension force of the first spring arm to cause the spring plate to snap back to the resting position; and
a plurality of holes in the first spring arm, wherein the first spring arm is securely held in physical communication with the touchpad holder via secure bonding adhesion between a plastic of the touchpad holder and the holes in the first spring arm.

16. The information handling system of claim 15, wherein the spring plate further includes a plurality of holes in the main frame, wherein the main frame is securely held in physical communication with the palm rest via secure bonding adhesion between a plastic of the palm rest and the holes in the main frame.

17. The information handling system of claim 15, wherein the palm rest portion, the touchpad holder and the spring plate form a single component based on the physical communication between the main frame and the palm rest portion and between the first and second spring arms and the touchpad holder.

* * * * *